United States Patent
Iyer et al.

(10) Patent No.: US 8,234,329 B2
(45) Date of Patent: Jul. 31, 2012

(54) EVENT PROCESSING

(75) Inventors: Sreekanth R. Iyer, Bangalore (IN); Gowdhaman Jayaseelan, Bangalore (IN); Jojo Joseph, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 326 days.

(21) Appl. No.: 12/623,595

(22) Filed: Nov. 23, 2009

(65) Prior Publication Data
US 2011/0125825 A1     May 26, 2011

(51) Int. Cl.
*G06F 15/16*     (2006.01)
(52) U.S. Cl. ......... 709/202; 709/201; 709/231; 709/246
(58) Field of Classification Search .................. 709/223, 709/226, 231, 239
See application file for complete search history.

(56) References Cited

U.S. PATENT DOCUMENTS

| | | | |
|---|---|---|---|
| 7,092,984 B2 | 8/2006 | Nishigaya et al. | |
| 7,143,410 B1 | 11/2006 | Coffman et al. | |
| 7,321,908 B2 | 1/2008 | Barabash et al. | |
| 2004/0128329 A1 | 7/2004 | Ben-Yitzhak et al. | |
| 2005/0278487 A1 | 12/2005 | Blandy | |
| 2009/0070786 A1* | 3/2009 | Alves et al. | 719/318 |
| 2011/0088035 A1* | 4/2011 | Etzion et al. | 709/231 |

OTHER PUBLICATIONS

Towards a Declarative Language for Parallel and Concurrent Programming, Published : 1995, http://citeseerx.ist.psu.edu/viewdoc/summary?doi=10.1.1.39.942.

* cited by examiner

*Primary Examiner* — Quang N. Nguyen
(74) *Attorney, Agent, or Firm* — Cuenot, Forsythe & Kim, LLC (57) ABSTRACT

A method, a system and a computer program for parallel event processing in an event processing network (EPN) are disclosed. The EPN has at least one event processing agent (EPA). The method includes assigning an execution mode for the at least one EPA, the execution mode including a concurrent mode and a sequential mode. The execution mode for the at least one EPA is stored in the EPN metadata. The method also includes loading and initializing the EPN. The method further includes routing the event in the EPN and, when an EPA is encountered, depending on the execution mode of the encountered EPA, further processing of the event. Also disclosed are a system and a computer program for parallel event processing in an event processing network (EPN).

6 Claims, 12 Drawing Sheets

EVENT PROCESSING

This application is related to the application entitled "Event Processing Networks", U.S. patent application Ser. No. 12/623,673, filed on Nov. 23, 2009, the contents of which are herein incorporated by reference in entirety.

BACKGROUND OF THE INVENTION

Event processing is a process of sensing, manipulating, responding to events and propagating events from an event source to a consumer of the event. Typically, event driven (ED) systems are capable of event processing. An ED system is facilitated and formally represented by means of an Event Processing Network (EPN), which can be represented as a graph having nodes and edges. The EPN consists of a set of Event Processing Agents (EPA) (the nodes) interconnected by communication channels.

Typically in event processing, there are multiple factors that determine the efficiency of the ED system. Some of the factors are, for example, latency, throughput etc. In such ED systems, when a parallel route exists for an event to traverse the EPN, the event passes through all the elements of the parallel branch of the EPN. This may necessitate a user working with the ED system to manage the life cycle of threads and handling synchronization issues that may arise from multiple threads accessing the same data.

BRIEF SUMMARY OF THE INVENTION

Aspects of the invention are directed to a method, a system and a computer program for parallel event processing in an event processing network.

Embodiments of the invention may include a system, a method and a computer program product for processing an event in an event processing network (EPN) having at least one event processing agent (EPA) in the EPN. An execution mode for at least one EPA is assigned, the execution mode including a concurrent mode and a sequential mode. The execution mode for the at least one EPA is stored in the EPN metadata.

According to an embodiment of the invention, an event is received, in response to an event occurrence, at an event source. The EPN is typically configured to include the event source. The EPN is then loaded. For example, the EPN is transferred from a storage device to a device memory; after loading the EPN, at least one EPA is initialized. Loading and initializing the EPN are tasks that may be performed by an appropriate driver. A further embodiment of the invention may include routing the event in the EPN until the EPA is encountered and an input event is identified. The input event corresponds to the encountered EPA. The execution mode of the encountered EPA is determined.

A further embodiment of the invention may include routing the input event to a subsequent EPA to determine if the execution mode is the sequential mode.

Yet a further embodiment may include processing and routing the event to determine if the execution mode is the concurrent mode. A replica of the input event is created. Each child EPA of the encountered EPA is then identified. The replica of the input event is allocated to each of the child EPAs of the encountered EPA. A change summary corresponding to each of the child EPAs is created, the change summary being associated with the input event. The change summary is modified in response to a modification performed by each of the child EPAs on the replica of the input event.

The change summary corresponding to each of the child EPAs of the encountered EPA is then synchronized and any conflict in the modifications is resolved, if and only if a conflict is identified between at least two of the change summaries. A modified input event is then generated using the synchronized change summary of each of the child EPAs of the encountered EPA. Subsequently, the modified input event is propagated in the EPN. Other embodiments are also disclosed.

BRIEF DESCRIPTION OF THE DRAWINGS

Embodiments of the invention are described in detail below, by way of example only, with reference to the following schematic drawings, where.

DETAILED DESCRIPTION OF THE INVENTION

Embodiments of the invention include processing of an event in an event processing network (EPN), the EPN having at least one event processing agent (EPA).

Figure 1A:
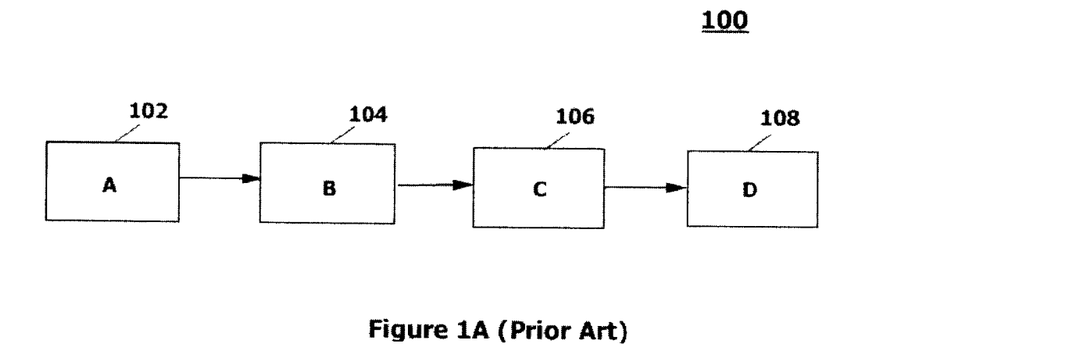
FIG. 1A shows a schematic of a currently existing typical sequential arrangement of four exemplary event processing agents (EPA) of a typical event processing network (EPN) found in prior art.

FIG. 1A illustrates a prior art schematic 100 of a sequential arrangement for example of four EPAs in an EPN. It should be obvious to one skilled in the art that the four EPAs are illustrative in nature and a typical EPN could consist of a number of EPAs. In the illustrative EPN, EPA A 102, EPA B 104, EPA C 106 and EPA D 108 are arranged in a sequential manner. This means that the output from EPA A 102 is routed to EPA B 104, the output from EPA B 104 is routed to EPA C 106 and the output from EPA C 106 is routed to EPA D 108.

Figure 1B:
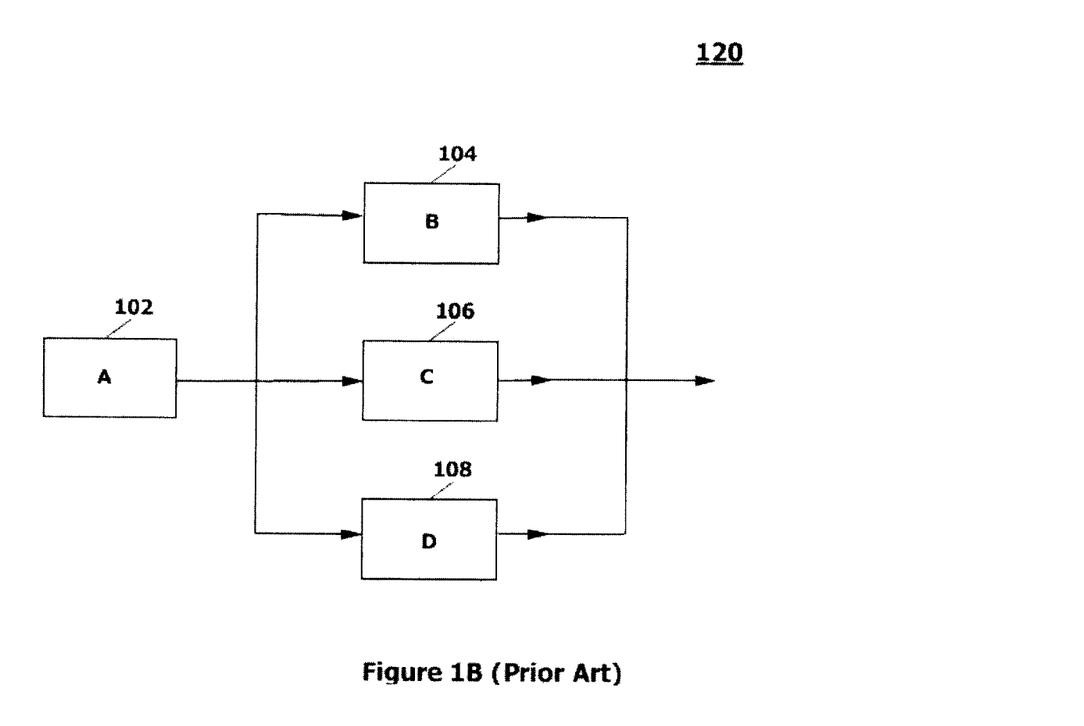
FIG. 1B shows a schematic of a currently existing typical parallel arrangement of four exemplary event processing agents (EPA) of a typical event processing network (EPN) found in prior art.

FIG. 1B illustrates a prior art schematic 120 of a typical parallel arrangement of exemplary EPAs. In this arrangement, EPA A 102 of FIG. 1A is the EPA where branching occurs and the same input event from EPA A 102 of FIG. 1A is routed to three more EPAs arranged in parallel, i.e. in a concurrent manner, in the EPN. The three EPAs that are parallel are EPA B 104, EPA C 106 and EPA D 108.

Figure 2A:
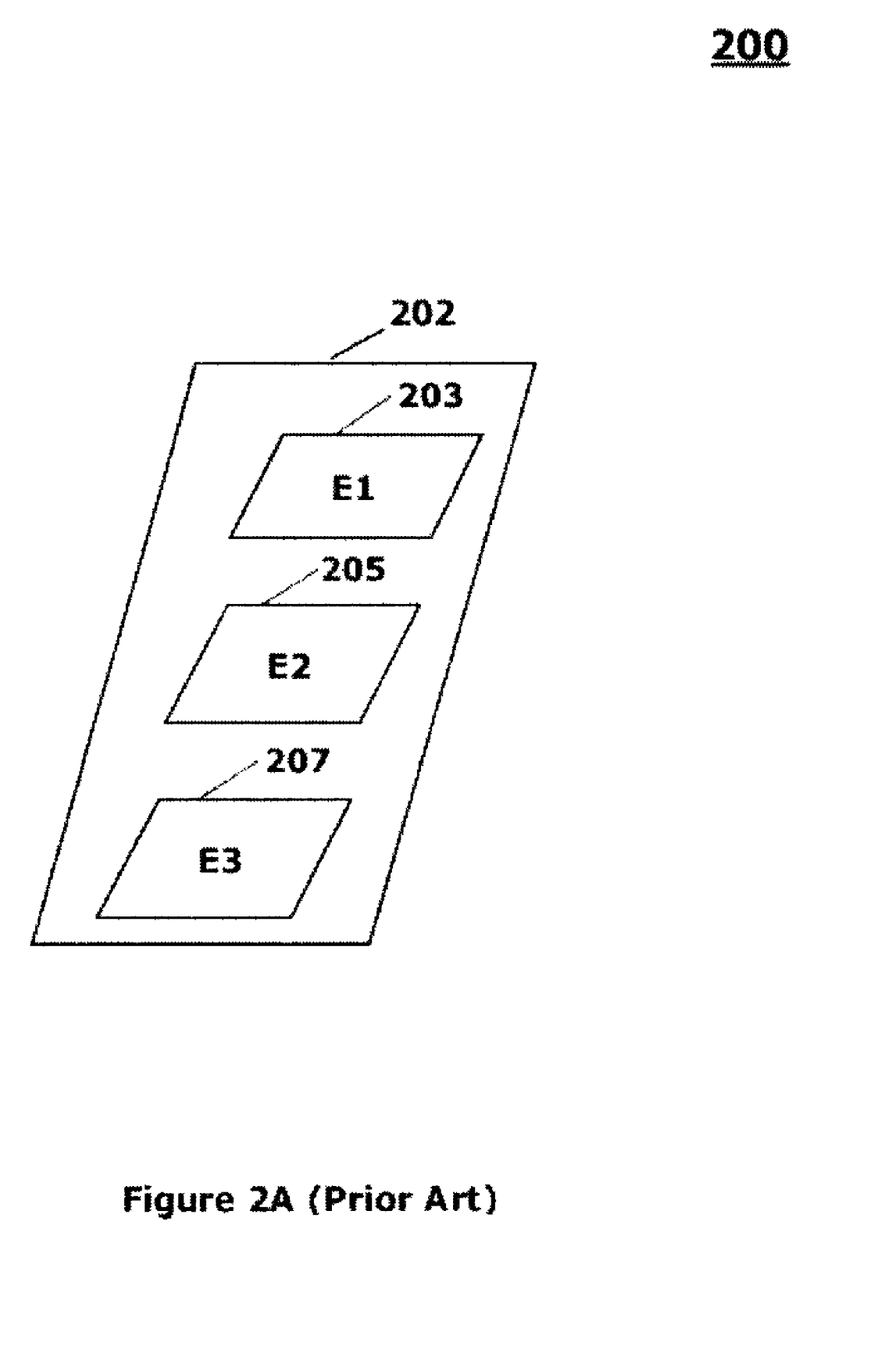
FIG. 2A shows a schematic of an exemplary input event, found in prior art.

FIG. 2A illustrates a schematic 200 of an exemplary input event 202, found in prior art. As shown in the input event 202, the input event 202 has for example three parts depicted by E1 203, E2 205 and E3 207. It should also be obvious to one skilled in the art that the number of parts is not restricted to three and that the input event can consist of two or more parts, and the more the number of parts, the more complex the event processing. The input event for example can be in the form of three variables. As an example, E1 203 is area to be painted red, E2 205 is an area to be painted white, and E3 207 is area to be painted blue. The input event occurs at a source in the EPN. One or more of these parameters may be modified at any given time in the EPN.

Figure 2B:
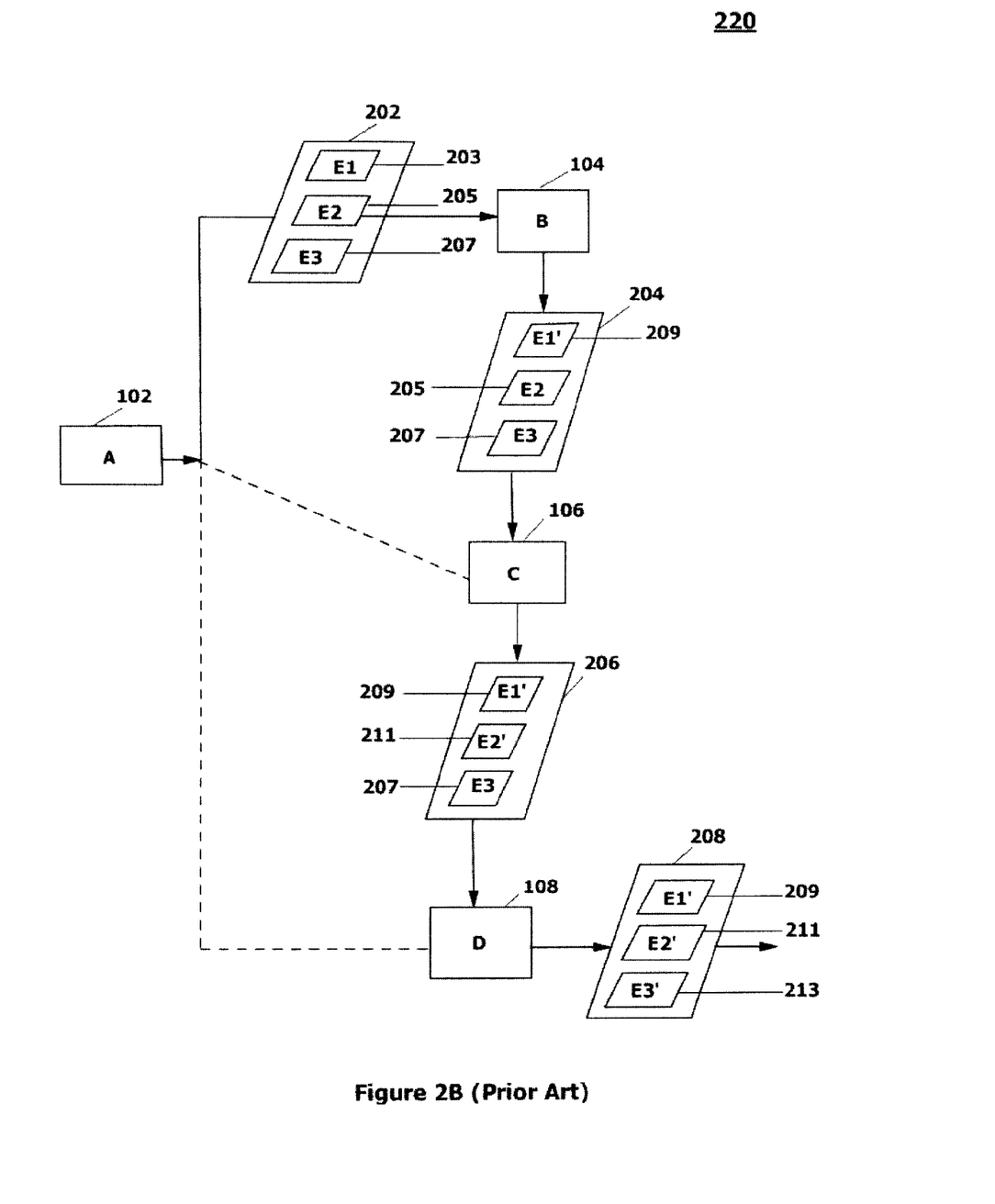
FIG. 2B shows a schematic of a currently existing mechanism of routing an input event, wherein an example input event is shown in FIG. 2A, in a parallel arrangement of the EPA of FIG. 1B, found in prior art.

FIG. 2B illustrates an existing mechanism 220 for routing an input event 202 of FIG. 2A, in a parallel arrangement of the EPA, found in prior art. As illustrated schematically, EPA A 102 has an input event 202 associated with it and in a currently existing mechanism, even though EPA A 104, EPA B 106 and EPA C 108 of FIG. 1B are arranged in parallel, FIG. 2B shows that the input event 202 of FIG. 2A is routed through EPA B 104, then through EPA C 106 and then through EPA D 108. Input event 202 of FIG. 2 has three parts E1 203, E2 205 and E207 as shown in FIG. 2A. After the input event 202 passes through EPA B 104, part E1 203 changes to E1' 209 (continuing with the example described in FIG. 2A, E1' 209 is now painted red) and parts E2 205 and E3 207 remain unchanged. The resulting intermediate input event 204 has three parts E1' 209, E2 205 and E3 207. Intermediate input event 204 then passes through EPA C 106 of FIG. 1A, and only part E2 205 changes to E2' 211 (continuing with the example described in FIG. 2A, E2' 211 is now painted white), resulting in the next intermediate input event 206. Thus intermediate input event 206 has three parts: E1' 209, E2' 211 and E3 207. Then intermediate input event 206 passes through EPA D 108 of FIG. 1A, and only part E3 207 is changed to E3' 213 (continuing with the example described in FIG. 2A, E3' 213 is now painted blue) while the other two parts, viz. E1' 209 and E2' 211 are unaffected, resulting in the modified input event 208. Modified input event 208 has three parts viz. E1' 209 (red), E2' 211 (white) and E3' 213 (blue).

Figure 3:
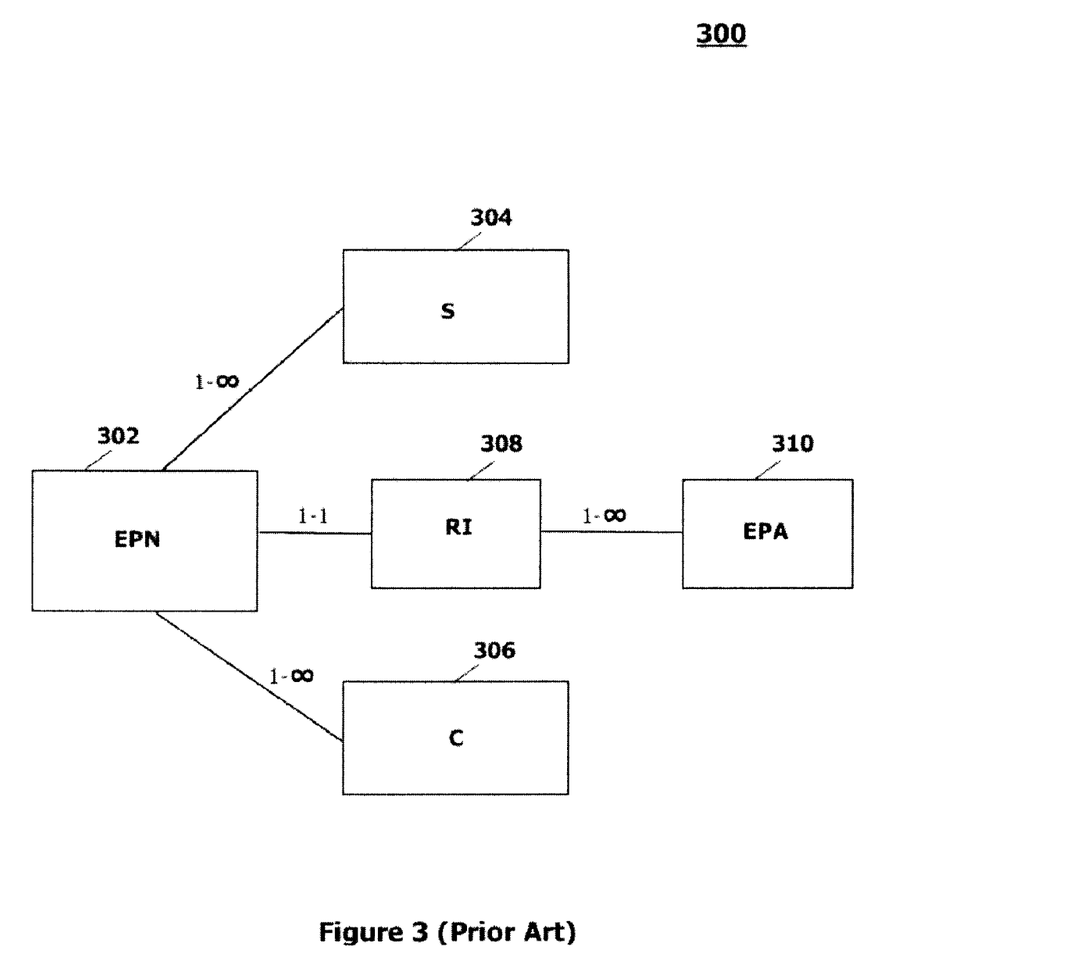
FIG. 3 shows a schematic of a currently existing EPN, found in prior art.

FIG. 3 illustrates a schema 300, represented in eXtensible Markup Language (XML), of an existing EPN, found in prior art. The schema 300 includes an EPN 302, an event source S 304, an event consumer C 306, a means for routing information RI 308 and an EPA 310. RI 308 also includes a conceptual chain of EPA 310.

Figure 4:
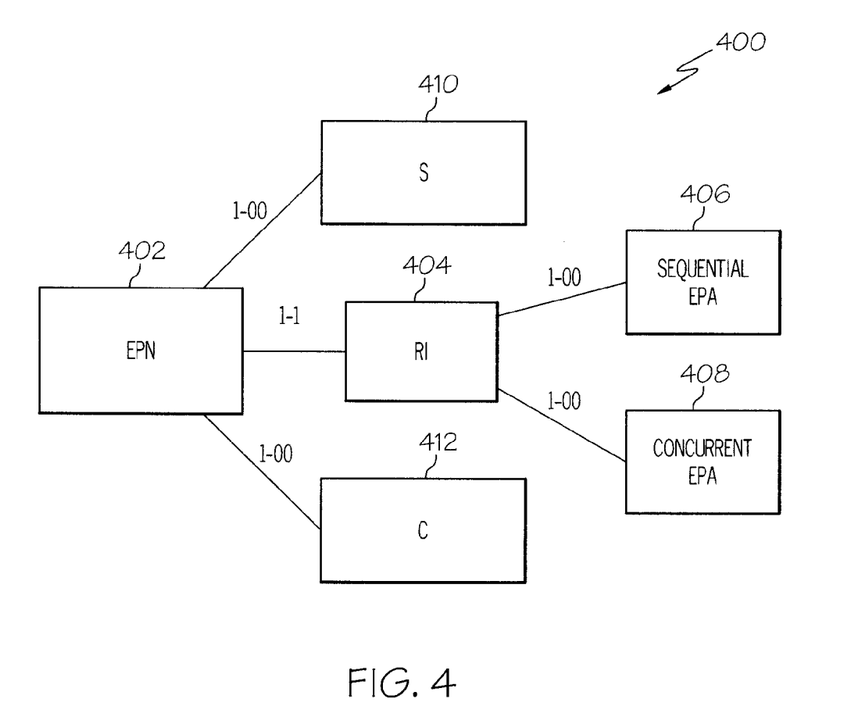
FIG. 4 illustrates an exemplary embodiment of a schematic in accordance with an embodiment of the invention.

FIG. 4 illustrates an exemplary embodiment of a schema 400, in an exemplary mode represented in XML, for an EPN in accordance with an embodiment of the invention. The schema 400 includes an EPN 402, an exemplary event source S 410, an exemplary event consumer C 412, an exemplary means for routing information RI 404, an exemplary sequential EPA 406, and an exemplary concurrent EPA 408. It should be understood by one skilled in the art that the schema 400 may include a plurality of any of these elements defined previously as singular elements in FIG. 4.

Figure 5A:
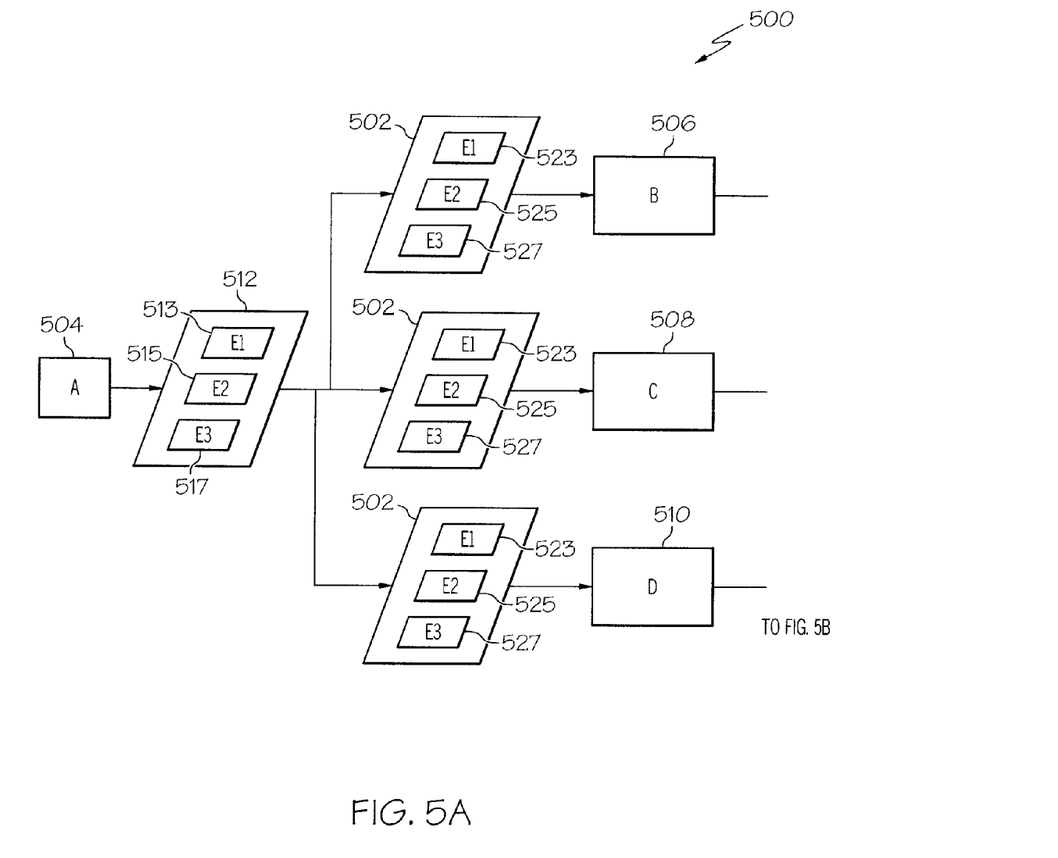
FIG. 5A and FIG. 5B illustrate an exemplary embodiment of a mechanism of routing an input event in a parallel arrangement of the EPA in accordance with an embodiment of the invention.
Figure 5B:
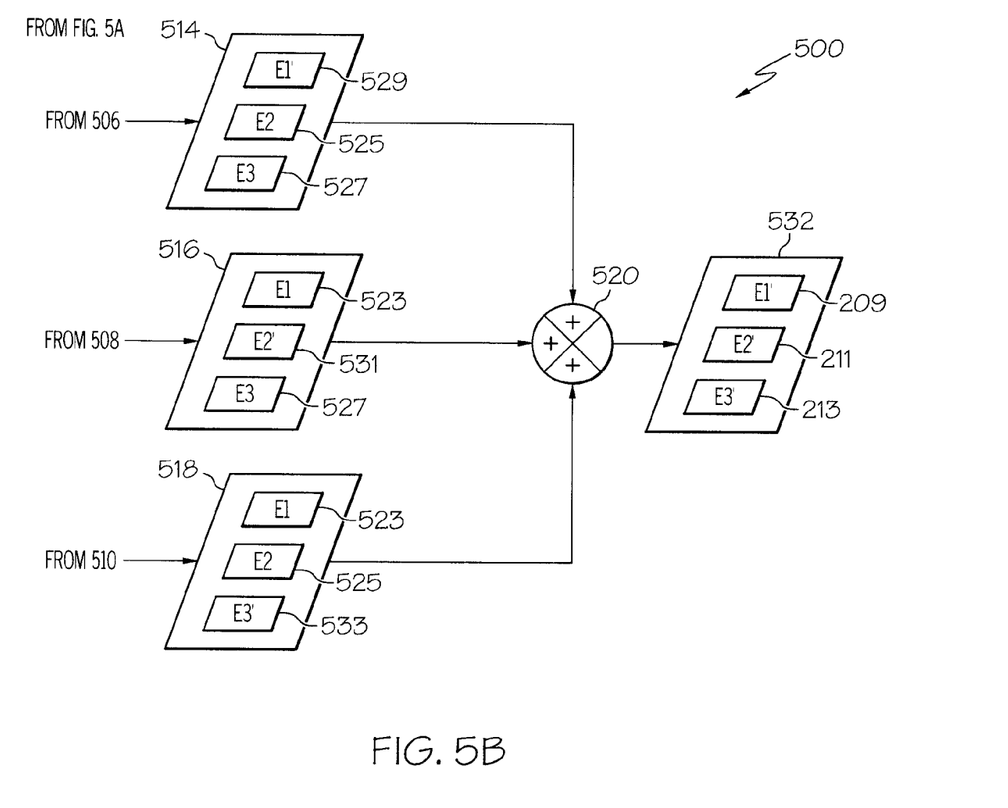

FIG. 5A and FIG. 5B illustrate an exemplary embodiment 500 of a mechanism for routing an input event in a parallel arrangement of the EPA. Exemplary embodiment 500 includes four EPA viz., EPA A 504, EPA B 506, EPA C 508 and EPA D 510. Exemplary embodiment 500 also includes input event 512 along with its three parts E1 513, E2 515, and E3 517. Exemplary embodiment 500 also includes three change summaries 514, 516 and 518 and modified input event 520.

Exemplary embodiment 500 shows that a replica 502 of input event 512 is made. When an event has occurred at an event source S 410 of FIG. 4, EPN 402 routes the event using the RI 404 of FIG. 4 and when it encounters an EPA where a branching is present, i.e. when the encountered EPA has concurrent execution mode, the child EPAs for the encountered EPA are identified. Schematic 500 depicts that in an exemplary mode, encountered EPA A 504 has three child EPAs, viz., EPA B 506, EPA C 508 and EPA D 510. EPA B 506, EPA C 508 and EPA D 510 are identified as the child EPAa of the encountered EPA. For EPA A 504 three identical replicas 502 of input event 512 are created. Replica 502 in the exemplary embodiment has same three parts E1 513, E2 515, and E3 517 as that of input event 512, and it should be obvious to one skilled in the art that the number of parts is not restrictive and could vary from case to case. For example as discussed previously, each of these three parts, could represent three variable elements such as three colors: red, white and blue. A change summary is created corresponding to each of the child EPAs: EPA B 506, EPA C 508 and EPA D 510 of the encountered EPA EPA A 504. A change summary indicates that a particular part of the child EPA has recorded a change in that parameter. When the event has been processed concurrently in the replica in exemplary embodiment 500 for child EPA B 506, a change summaryB 514 is created. A similar approach is adapted for another child EPA C 508, creating a change summaryC 516, and for child EPA D 108 creating change summaryD 518.

When replica 502 is modified by the first child EPA, EPA B 506, only part E1 523 is modified to E1' 529 and change summaryB 514 includes E1' 529, E2 525 and E3 527. When replica 502 is modified by the second child EPA, EPA C 508, only part E2 525 is modified to E2' 531 and change summaryC 516 includes E1 523, E2' 531 and E3 527. When replica 502 is modified by the third child EPA, EPA D 510, only part E3 527 is modified to E3' 533 and change summaryD 518 includes E1 523, E2 525 and E3' 533.

Schematic 500 then shows that all three exemplary change summaries, change summaryB 514, change summaryC 516, and change summaryD 518 are compared and merged in synchronization element 520. Synchronization of the change summary results into a modified input event 532, which has three parts E1' 529, E2' 531 and E3' 533.

Figure 6:
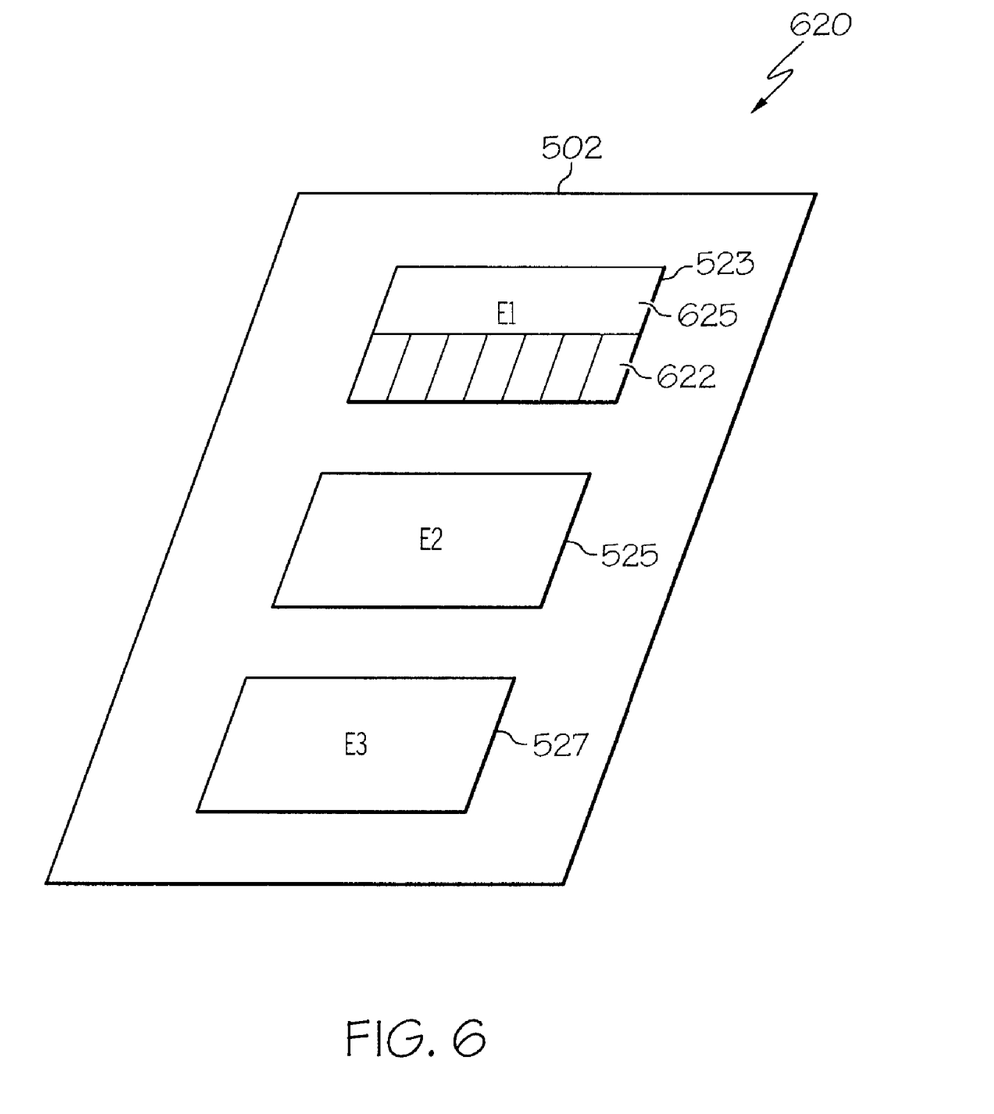
FIG. 6 illustrates an exemplary embodiment of conflict encountered in event processing.

FIG. 6 illustrates an exemplary embodiment 620 of a replica with a conflict 622, as a highlighted zone, overlapping at least two parts of the input event, in the modifications encountered in the synchronization element 520 of FIG. 5B in event processing. Conflict in the modifications is encountered when more than one child EPA of the encountered EPA act on some or all of a part of the input event. In the exemplary mode, schematic 620 shows that the part E1 523 is divided into section X 625 and section Y 622. In an exemplary mode, when replica 502 of FIG. 5A is modified by the first child EPA, EPA B 506 of FIG. 5A, only part E1 523 is modified to E1' 529 and E2 525 and E3 527 of FIG. 5A are not modified. Thus both the sections X 625 and Y 622 of E1 523 are modified and painted red. When replica 502 is modified by the second child EPA, EPA C 508, of FIG. 5A, part E2 525 is modified to E2' 531 and part E3 527 is not modified. However, the second child EPA, EPA C 508, of FIG. 5A also modifies section Y 622 of part E1 523 to white. This double modification, first being colored red by the first child EPA, EPA C 506, and then colored white by the second child EPA, EPA C 508, causes section Y 622 to be pink (red and white together) and is hence a conflict.

Figure 7:
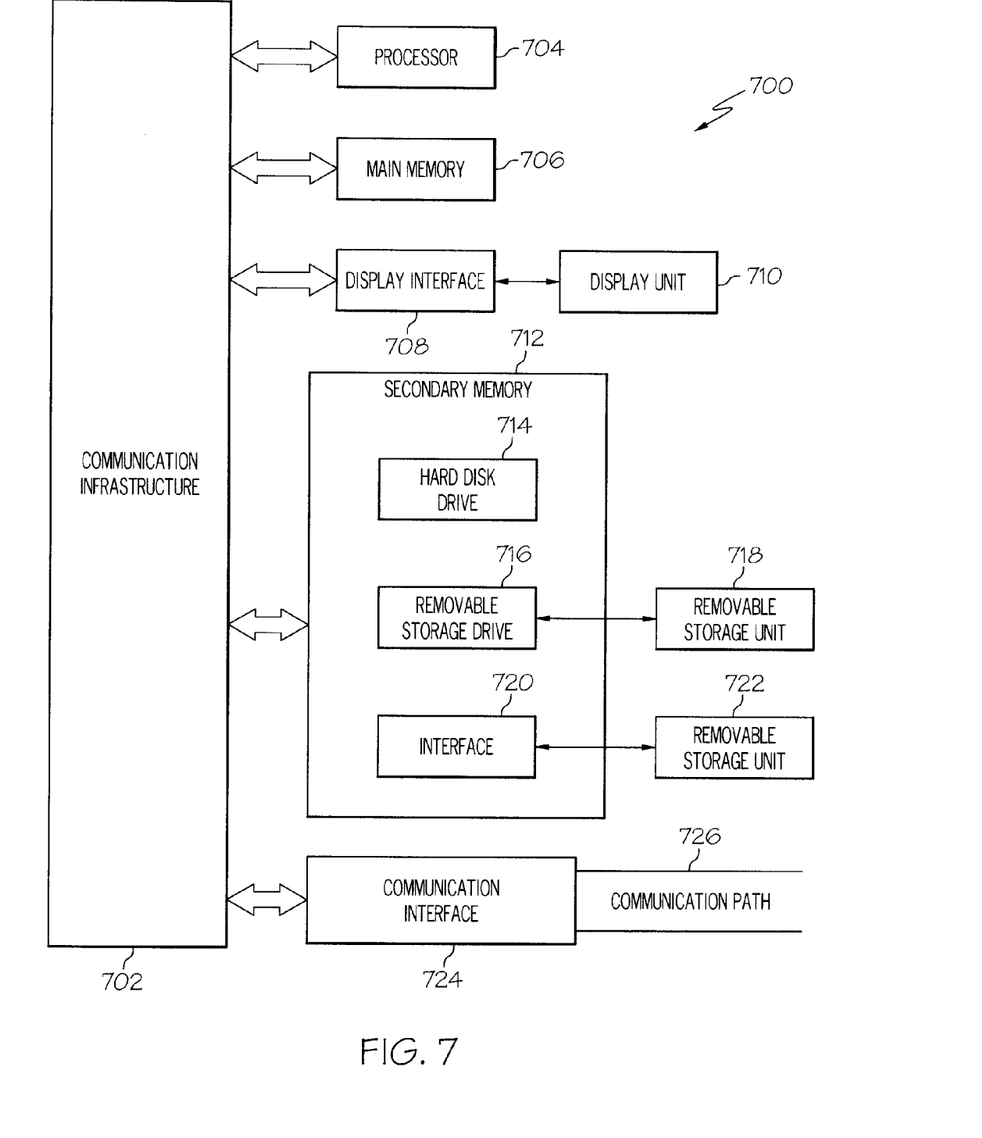
FIG. 7 illustrates an exemplary embodiment of a computer system used for processing an event in an event processing network (EPN).

FIG. 7 illustrates an exemplary embodiment of a block diagram of a computer system 700 that can be used for implementing various embodiments of the present invention. In some embodiments, the computer system 700 can be used as the event processing network 402 of FIG. 4. The computer system 700 includes a processor 704. It should be understood that although FIG. 7 illustrates a single processor, one skilled in the art would appreciate that more than one processor can be included as needed. The processor 704 is connected to a communication infrastructure 702 (for example, a communications bus, cross-over bar, or network) where the communication infrastructure 702 is configured to facilitate communication between various elements of the exemplary computer system 700. Various software embodiments are described in terms of this exemplary computer system. After reading this description, it will become apparent to a person of ordinary skill in the relevant art(s) how to implement the invention using other computer systems and/or computer architectures.

Exemplary computer system 700 can include a display interface 708 configured to forward graphics, text, and other data from the communication infrastructure 702 (or from a frame buffer not shown) for display on a display unit 710. The computer system 700 also includes a main memory 706, which can be random access memory (RAM), and may also include a secondary memory 712. The secondary memory 712 may include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a manner well known to those having ordinary skill in the art. The removable storage unit 718, represents, for example, a floppy disk, magnetic tape, optical disk, etc. which is read by and written to by the removable storage drive 716. As will be appreciated, the removable storage unit 718 includes a computer usable storage medium having stored therein computer software and/or data.

In exemplary embodiments, the secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system 700.

The computer system 700 may also include a communications interface 724. The communications interface 724 allows software and data to be transferred between the computer system and external devices. Examples of the communications interface 724 may include a modem, a network interface (such as an Ethernet card), a communications port, a PCMCIA slot and card, etc. Software and data transferred via the communications interface 724 are in the form of signals which may be, for example, electronic, electromagnetic, optical, or other signals capable of being received by communications interface 724. These signals are provided to the communications interface 724 via a communications path (that is, channel) 726. The channel 726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 706 and the secondary memory 712, the removable storage drive 716, a hard disk installed in the hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in the main memory 706 and/or the secondary memory 712. Computer programs may also be received via the communications interface 724. Such computer programs, when executed, can enable the computer system to perform the features of exemplary embodiments of the present invention as discussed herein. In particular, the computer programs, when executed, enable the processor 704 to perform the features of the computer system 700. Accordingly, such computer programs represent controllers of the computer system.

Figure 8:
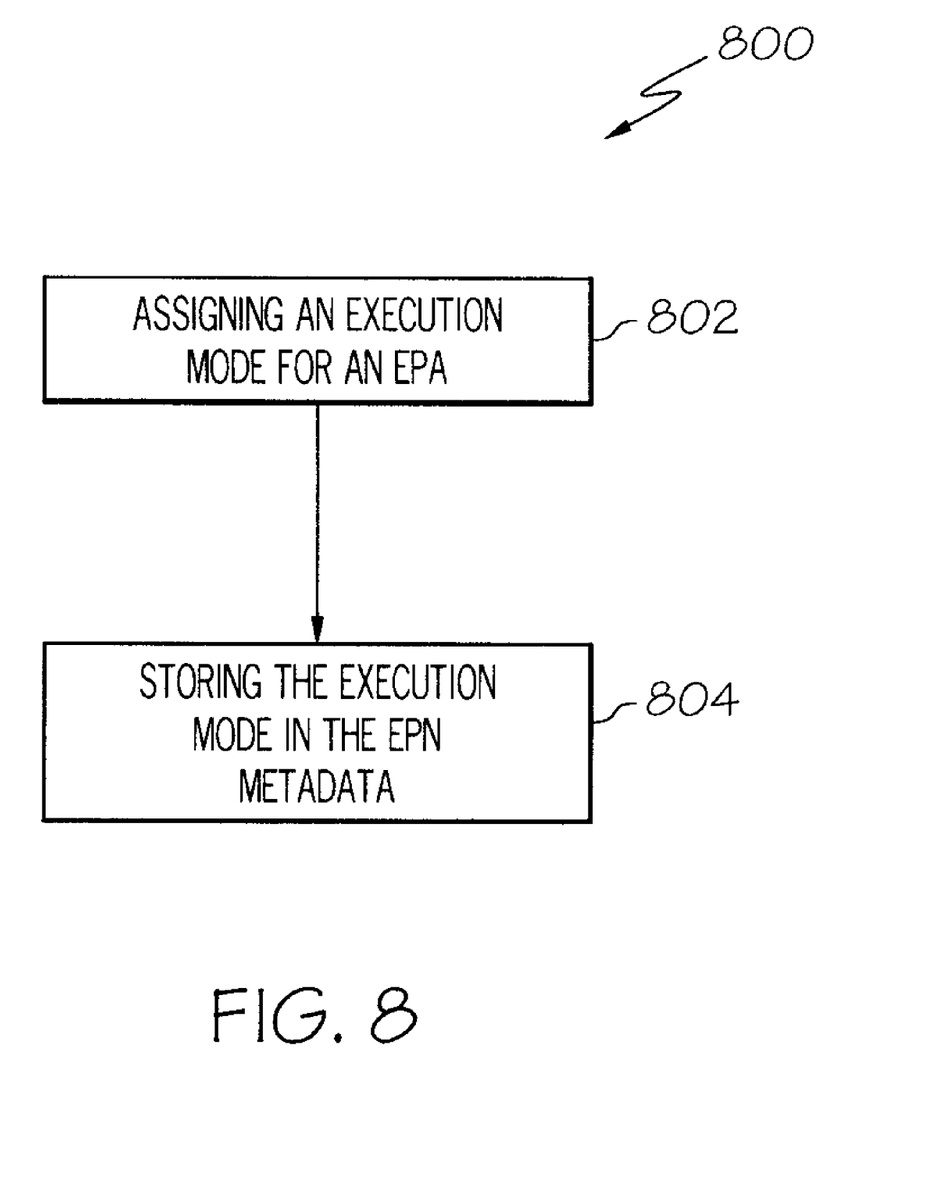
FIG. 8 illustrates an exemplary embodiment of a flowchart for constructing an EPN with at least one EPA having the execution mode.

FIG. 8 illustrates an exemplary embodiment of a flowchart for the method 800 for constructing an EPN with at least one EPA, In the exemplary method, step 802 depicts assigning an execution mode for at least one EPA in the EPN, where the execution mode is selected from a concurrent mode and a sequential mode. Step 804 depicts storing the execution mode for the at least one EPA in the EPN metadata, wherein the EPN metadata is stored in a memory that is used to implement the EPN.

Figure 9:
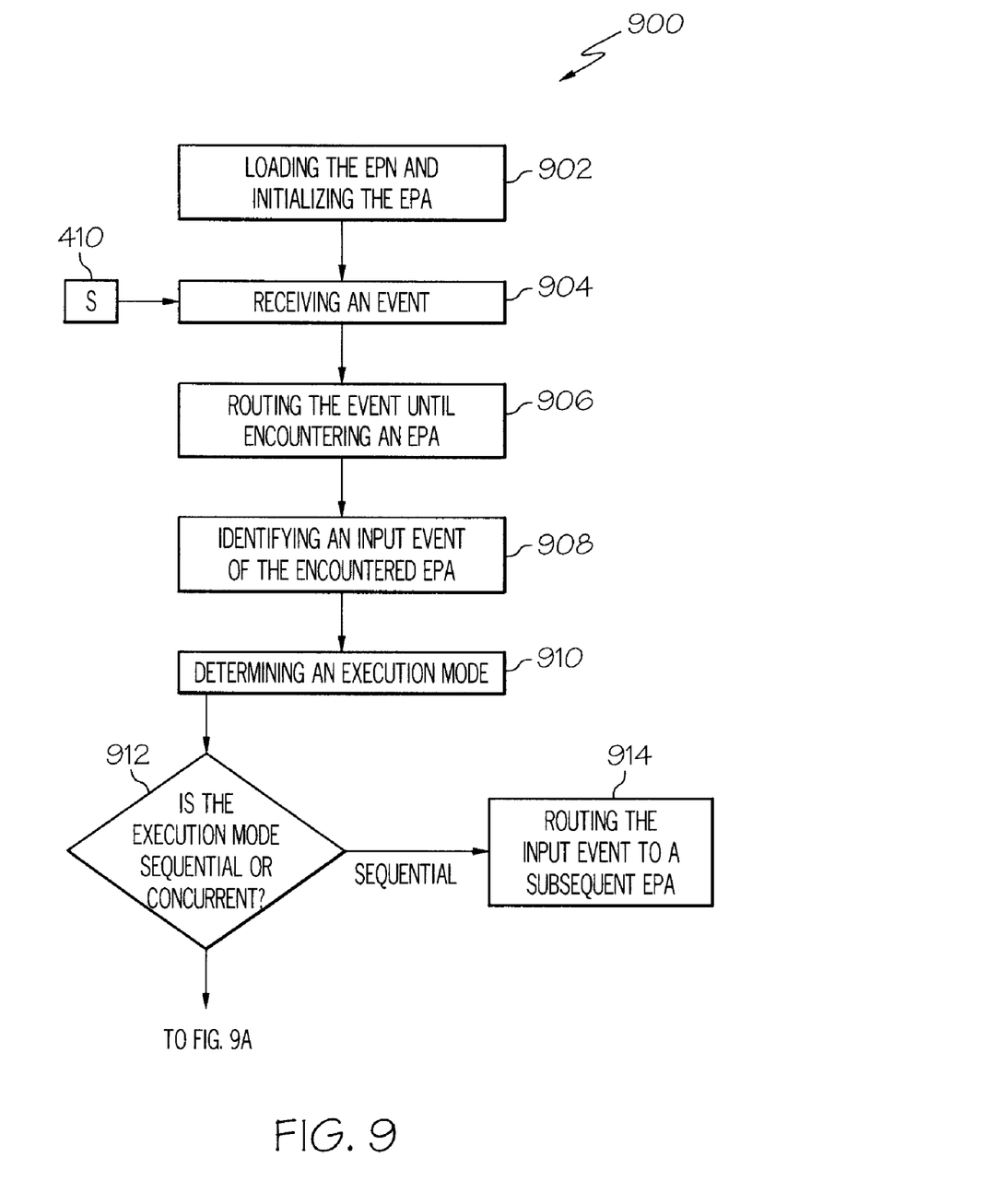
FIG. 9 and FIG. 9A illustrate an exemplary embodiment of a flowchart for using an EPN for processing an event in the EPN.
Figure 9A:
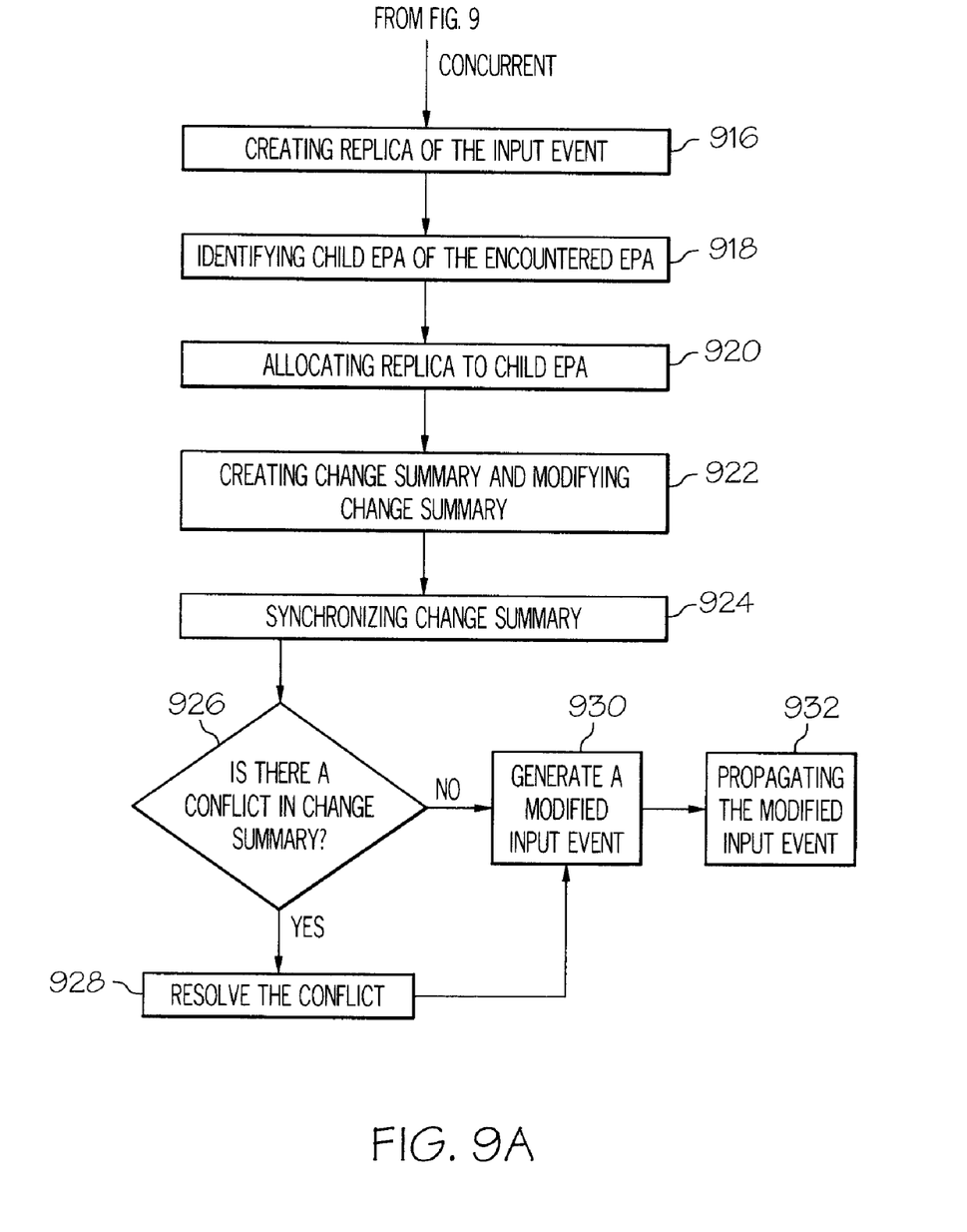

FIG. 9 and FIG. 9A together illustrate an exemplary embodiment of a flowchart of a method 900 for using an EPN, specifically for processing an event in the EPN. Step 902 depicts loading the EPN and initializing at least one EPA in the EPN. The step of loading includes creating a structure representing the EPN using the EPN metadata. The step of loading further may include reading a configuration file that contains the EPN definition, parsing the file and creating an in-memory structure representing the EPN. Step 904 depicts receiving an event, in response to an event occurrence at an event source S 410 of FIG. 4.

Step 906 involves routing the event until encountering the EPA. When an EPA is encountered, step 908 involves identifying an input event 512 of FIG. 5A. The input event 512 of FIG. 5A corresponds to the encountered EPA, EPA A 504 of FIG. 5A. Step 910 depicts determining the execution mode of the encountered EPA, EPA A 504 of FIG. 5A. At step 912 a decision is made on the execution mode identified in step 910 to determine if the execution mode is sequential or concurrent. If the execution mode is identified to be sequential then step 914 depicts routing the input event to a subsequent EPA. If the execution mode is identified to be concurrent then at step 916 a replica of the input event is created. Step 918 involves identifying each child EPA of the encountered EPA and step 920 depicts allocating the replica of the input event to each child EPA of the encountered EPA.

Step 922 depicts creating and modifying change a summary corresponding to each of the child EPAs. The change summary is associated with the input event. Step 922 also depicts modification performed by each of the child EPAs on the replica. Step 924 depicts synchronizing the change summary corresponding to each of the child EPAs of the encountered EPA. Synchronization further includes the steps of comparing the change summary of each of the child EPA and merging the modifications performed by each of the child EPA on the exemplary replica. Step 926 depicts checking for the existence of any conflict after synchronization. If there is no conflict found, then step 930 depicts generating a modified input event using the synchronization of the change summary results. If there is a conflict in change summary of two or more child EPAs of the encountered EPA, resolution of the conflict is necessary. Step 928 depicts resolving the conflict. After the conflict is resolved, the resolved change summaries are used to generate a modified input event. This is shown in step 930. After the modified input event is generated it is then propagated in the EPN for further processing. This is shown in step 932.

It should be obvious to one skilled in the art that the method 800 as shown in FIG. 8 and method 900 as described in FIG. 9 and FIG. 9A, can be implemented on the computer system 700 as described in FIG. 7.

Advantages of various aspects of the invention may include achieving parallelism in event processing by declaratively indicating that multiple EPA can be executed concurrently. Another advantage may be that a replica of the same input event is passed to the child EPA of the encountered EPA and hence the factors, such as, for example, latency and throughput, are favorable. Another advantage of various aspects of the invention may include a mechanism by which developers can create an EPA that can be executed concurrently without the developer/programmer having to code for managing the life cycle of threads and handling synchronization issues arising from multiple threads trying to access the same data. Another advantage that some of the embodiments can provide may be a mechanism to make use of the hardware level parallelism without the explicit use of parallel programming constructs.

The described techniques may be implemented as a method or an apparatus/system involving software, firmware, micro-code, hardware such as logic, memory and/or any combination thereof. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

Embodiments of the invention further provide a storage medium tangibly embodying a program of machine-readable instructions executable by a digital processing apparatus to carry out a method of processing an event in an event processing network, as described in the various embodiments set forth above and described in detail.

What is claimed is:

1. A method for processing an event in an event processing network, the method comprising:

assigning an execution mode for at least one event processing agent (EPA) in an event processing network (EPN), the execution mode includes a concurrent mode and a sequential mode;

storing the execution mode for the at least one EPA in EPN metadata;

receiving an event, in response to an event occurrence at an event source, wherein the EPN includes the event source;

loading the EPN, wherein loading the EPN comprises creating a structure representing the EPN using the EPN metadata;

initializing the at least one EPA in the EPN;

routing the event in the EPN until encountering the EPA;

identifying an input event, wherein the input event corresponds to the encountered EPA;

determining the execution mode of the encountered EPA;

upon the execution mode determined to be in the concurrent mode, creating a replica of the input event;

identifying each child EPA of the encountered EPA;

allocating the replica of the input event to each child EPA of the encountered EPA;

creating a change summary corresponding to each child EPA, wherein the change summary is associated with the input event;

modifying the change summary corresponding to each child EPA in response to a modification performed by each child EPA on the replica of the input event; and synchronizing the change summaries.

2. The method of claim 1, wherein synchronizing further comprises:

comparing the change summaries; and merging the modifications performed by each child EPA on the replica of the input event.

3. The method of claim 2, further comprising:

identifying if there is a conflict in the modifications between at least two of the change summaries;

upon identification of a conflict, resolving the conflict; and generating a modified input event using the synchronized change summary of each child EPA of the encountered EPA.

4. The method of claim 3, further comprising:

propagating the modified input event in the EPN.

5. A system for processing an event in an event processing network, the system comprising:

a processor configured to:

assign an execution mode for at least one event processing agent (EPA) in an event processing network (EPN), wherein the execution mode includes a concurrent mode and a sequential mode;

store the execution mode for the at least one EPA in EPN metadata;

receive an event, in response to an event occurrence at an event source, wherein the EPN includes the event source;

load the EPN, wherein loading the EPN comprises creating a structure representing the EPN using the EPN metadata;

initialize the at least one EPA in the EPN;

route the event in the EPN until encountering the EPA;

identify an input event, wherein the input event corresponds to the encountered EPA;

determine the execution mode of the encountered EPA;

upon the execution mode determined to be in the concurrent mode:

create a replica of the input event;

identify each child EPA of the encountered EPA;

allocate the replica of the input event to each child EPA of the encountered EPA;

create a change summary corresponding to each child EPA, wherein the change summary is associated with the input event;

modify the change summary corresponding to each child EPA in response to a modification performed by each child EPA on the replica of the input event;

synchronize the change summaries;

compare the change summaries;

merge the modifications performed by each child EPA on the replica of the input event;

identify if there is a conflict in the modifications between at least two of the change summaries;

upon identification of said conflict, resolve the conflict;

generate a modified input event using the synchronized change summary of each child EPA of the encountered EPA; and propagate the modified input event in the EPN.

6. A storage device tangibly embodying a program of machine-readable instructions executable by a digital processing apparatus to carry out a method of processing an event in an event processing network, the storage medium configured to:

assign an execution mode for at least one event processing agent (EPA) in an event processing network (EPN), wherein the execution mode includes a concurrent mode and a sequential mode;

store the execution mode for the at least one EPA in EPN metadata;

receive an event, in response to an event occurrence, at an event source, wherein the EPN includes the event source;

load the EPN, wherein loading the EPN comprises creating a structure representing the EPN using the EPN metadata;

initialize the at least one EPA in the EPN;

route the event in the EPN until encountering the EPA;

identify an input event, wherein the input event corresponds to the encountered EPA;

determine the execution mode of the encountered EPA;

upon the execution mode determined to be in the concurrent mode, create a replica of the input event;

identify each child EPA of the encountered EPA;

allocate the replica of the input event to each of the child EPAs of the encountered EPA;

create a change summary corresponding to each of the child EPAs, wherein the change summary is associated with the input event;

modify the change summary in response to a modification performed by each of the child EPAs on the replica of the input event;

synchronize the change summaries corresponding to each of the child EPAs of the encountered EPA;

compare the change summary of each of the child EPAs;

merge the modifications performed by each of the child EPAs on the replica of the input event;

resolve a conflict in the modifications, if the conflict is identified between at least two of the change summaries;

generate a modified input event using the synchronized change summaries of each of the child EPAs of the encountered EPA; and propate the modified input event in the EPN.

* * * * *